(12) United States Patent
Lung

(10) Patent No.: US 7,031,057 B2
(45) Date of Patent: Apr. 18, 2006

(54) BINOCULARS

(75) Inventor: Huang Chien Lung, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 34 days.

(21) Appl. No.: 10/931,639

(22) Filed: Sep. 1, 2004

(65) Prior Publication Data
US 2005/0146785 A1    Jul. 7, 2005

(30) Foreign Application Priority Data
Jan. 5, 2004   (TW)   ............... 93100120 A

(51) Int. Cl.
G02B 23/00    (2006.01)
(52) U.S. Cl. .................................... 359/412
(58) Field of Classification Search .............. 359/407, 359/408, 409, 411, 412, 417, 418
See application file for complete search history.

(56) References Cited

U.S. PATENT DOCUMENTS 5,572,361 A * 11/1996 Kamiya et al. ............. 359/426
5,822,115 A * 10/1998 Umeda et al. .............. 359/412
6,760,163 B1 * 7/2004 Hirunuma et al. .......... 359/694

* cited by examiner

*Primary Examiner*—Mark A. Robinson
*Assistant Examiner*—Alessandro Amari
(74) *Attorney, Agent, or Firm*—Thomas, Kayden, Horstemeyer & Risley

(57) ABSTRACT

Binoculars. First and second posts are movably disposed in first and second guide slots respectively. A first resilient member is disposed between a first abutting surface and a cover, and the first post slides in the first guide slot facilitating a first barrel to move perpendicular to a first optical axis thereof. Similarly, a second resilient member is disposed between a second abutting surface and the cover, and the second post slides in the second guide slot, facilitating the second barrel to move perpendicular to a second optical axis thereof.

6 Claims, 4 Drawing Sheets

103

BINOCULARS

BACKGROUND

The present invention relates in general to binoculars and in particular to binoculars maintaining barrel parallelity during adjustment.

As human eye spans are different, conventional binoculars are generally provided with an adjustment mechanism between two barrels. Each barrel is provided with a post sliding in a guide rail such that distance between the barrels is manually adjusted. However, as the post is usually metallic and rigid, gaps between the post and the guide rail may occur, leading to adverse reflection. Further, the post may stick in the guide rail if press-fitted.

SUMMARY

Accordingly, an embodiment of the present invention provides a binoculars maintaining barrel parallelity during adjustment. The binoculars comprises a first barrel, a second barrel, a first cover, a second cover, a first resilient member and a second resilient member. The first barrel defines a first optical axis and comprises a first post and a first abutting surface. The second barrel defines a second optical axis parallel to the first optical axis and comprises a second post and a second abutting surface. The first cover comprises a first guide slot perpendicular to the first optical axis and a second guide slot perpendicular to the second optical axis, wherein the first post is movably disposed in the first guide slot and the second post is movably disposed in the second guide slot. The second cover is connected with the first cover, wherein the first and second barrels are disposed between the first and second covers. The first resilient member is disposed between the first abutting surface and the first cover, and the first post slides in the first guide slot such that the first barrel moves perpendicular to the first optical axis. Similarly, the second resilient member is disposed between the second abutting surface and the second cover, and the second post slides in the second guide slot such that the second barrel moves perpendicular to the second optical axis.

In an embodiment, the first and second posts are threaded and press-fitted in the first and second guide slots respectively.

BRIEF DESCRIPTION OF THE DRAWINGS

The invention will become more fully understood from the detailed description given hereinbelow and the accompanying drawings, given by way of illustration only and thus not intended to be limitative thereof.

DETAILED DESCRIPTION

Figure 1:
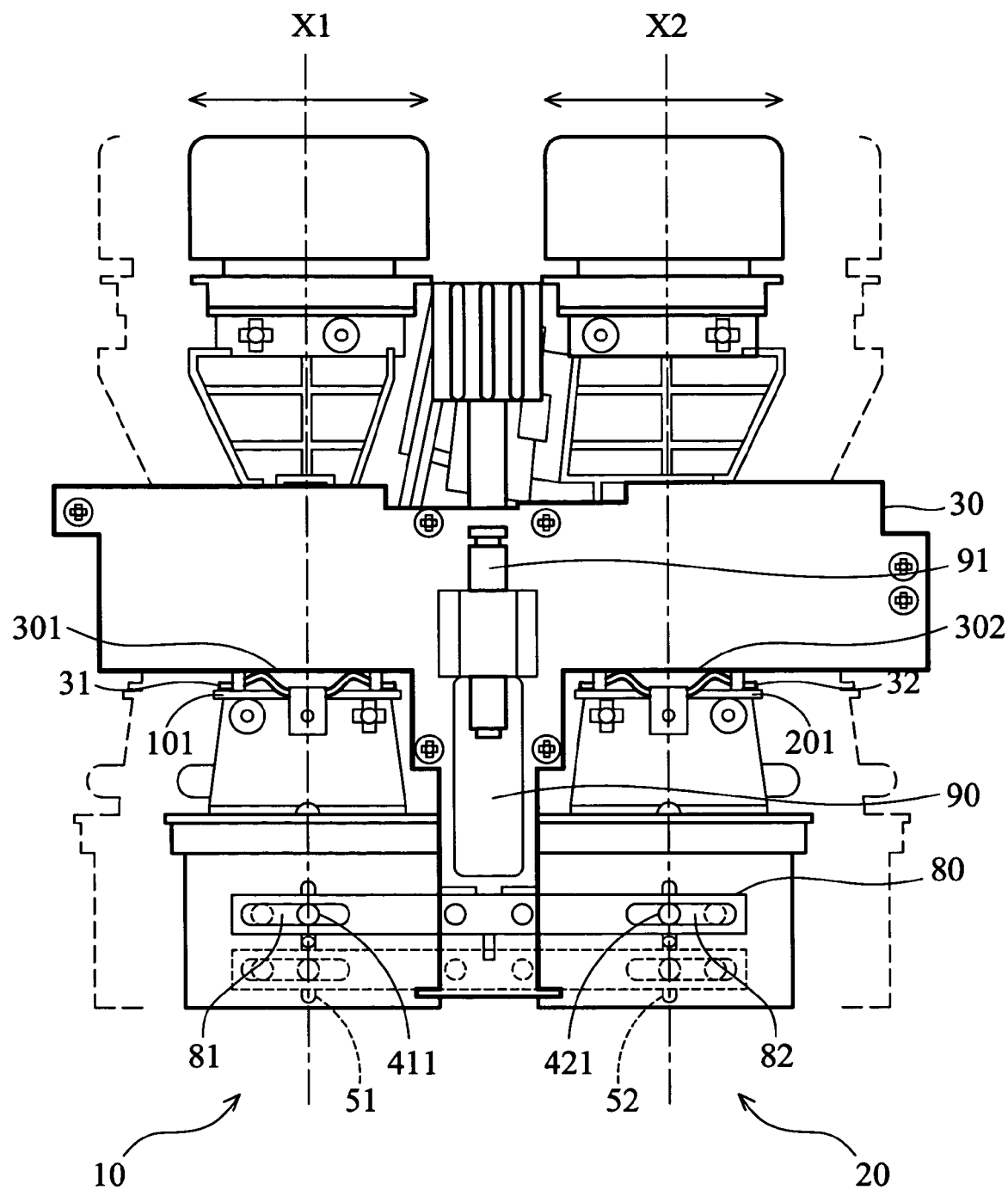
FIG. 1 is a top perspective view of binoculars in accordance with an embodiment of the invention.
Figure 2:
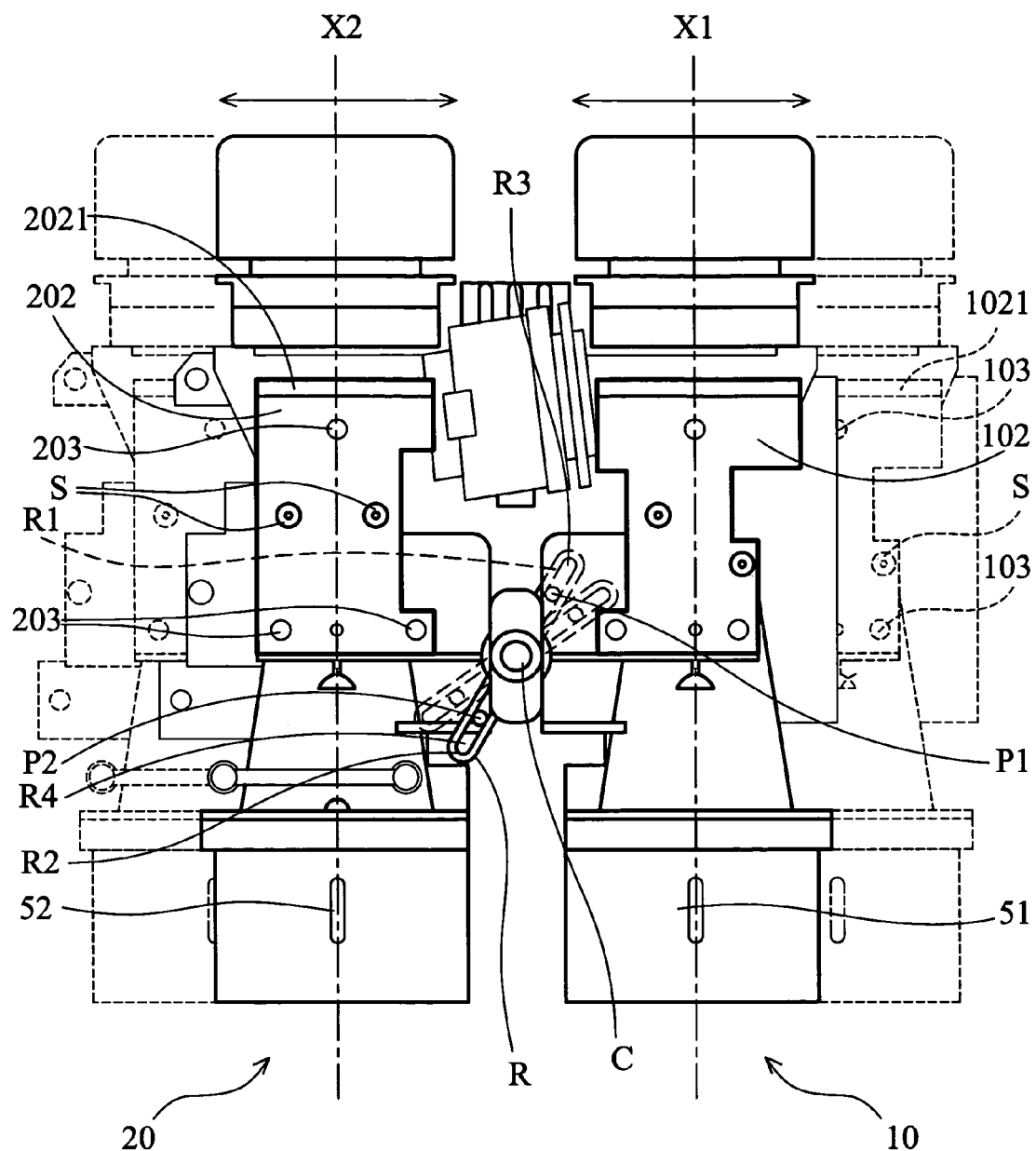
FIG. 2 is a top perspective view of binoculars without the first cover in accordance with an embodiment of the invention.
Figure 3:
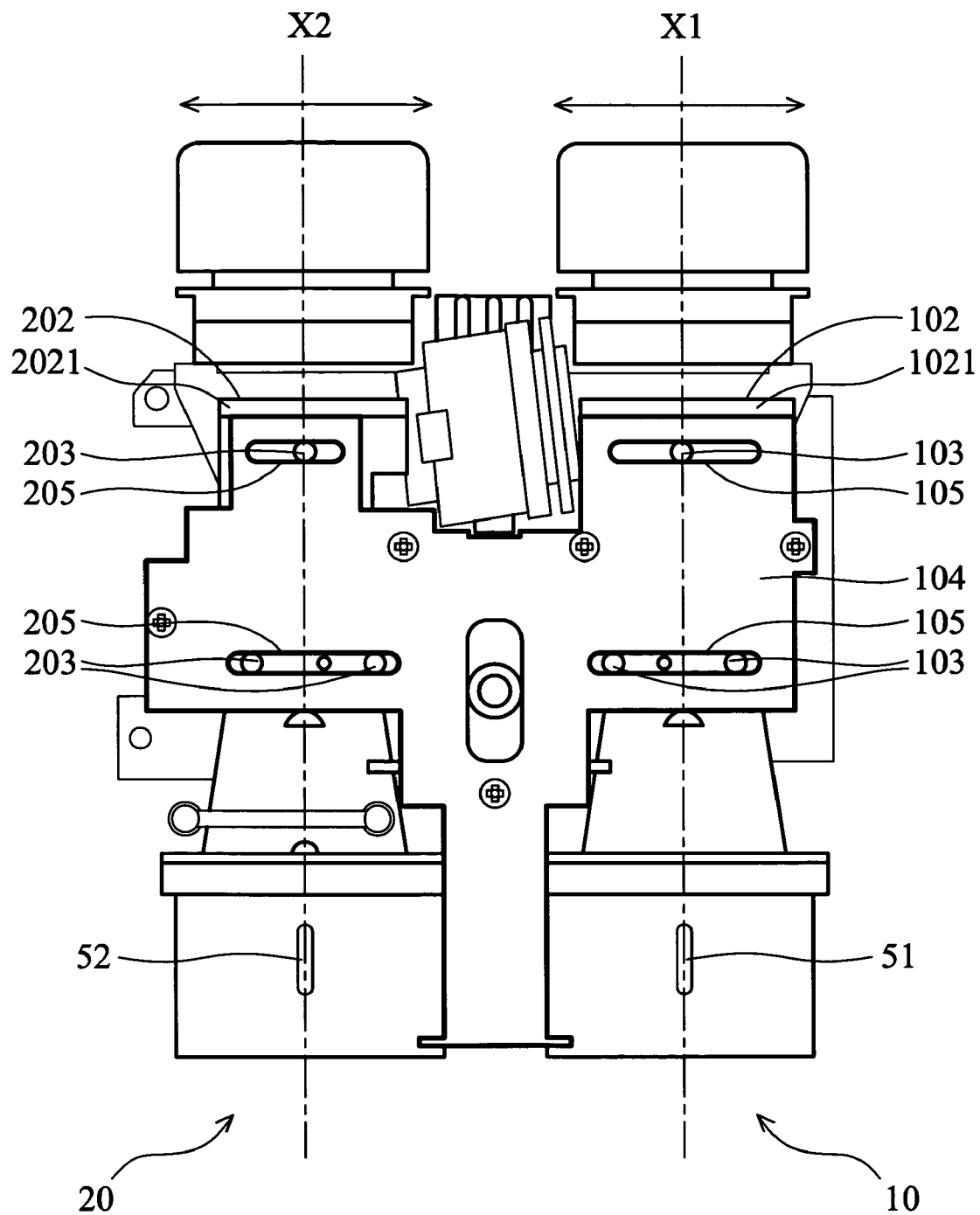
FIG. 3 is a bottom perspective view of binoculars provided with the first cover in accordance with an embodiment of the invention.

Referring to FIG. 1, binoculars of an embodiment the invention primarily comprise a first barrel 10, a second barrel 20, a first cover 104 and a second cover 30 (as shown in FIGS. 2 and 3). The first and second covers 104 and 30, enclosing the first and second barrels 10 and 20, are secured by screws such that the barrels 10 and 20 are manually connected.

As shown in FIG. 1, the first and second barrels 10 and 20 are parallel and respectively define a first optical axis X1 and a second optical axis X2, parallel to each other. As shown by the arrows in FIG. 1, the first and second barrels 10 and 20 are movable perpendicular to the optical axes X1 and X2 such that the distance between the two barrels 10 and 20 is manually adjustable.

To prevent deflection of the optical axes X1 and X2 when manually adjusting the barrels 10 and 20, a first resilient member 31 and a second resilient member 32 are applied. Referring to FIG. 1, the first resilient member 31 is fixed on a first abutting surface 101 of the first barrel 10 and located between the first abutting surface 101 and a first contact surface 301 of the second cover 30. Similarly, the second resilient member 32 is fixed on a second abutting surface 201 of the second barrel 20 and located between the second abutting surface 201 and a second contact surface 302 of the second cover 30. As shown in FIG. 1, the contact surfaces 301 and 302, and the abutting surfaces 101 and 201 are perpendicular to the first and second optical axes X1 and X2.

With respect to the bottom perspective view as shown in FIGS. 2 and 3, a first blocking portion 1021 and a second blocking portion 2021 respectively project from the first and second barrels 10 and 20 and abut the first cover 104 when the first cover 104 is connected. That is, the covers 104 and 30 are joined and restricted between the blocking portions 1021, 2021 and the resilient members 31, 32. Referring to FIGS. 1 and 3, the contact surfaces 301 and 302 of the second cover 30 movably abut the resilient members 31 and 32, and the first cover 104 movably contacts the blocking portions 1021 and 2021.

The first and second resilient members 31 and 32 are wave-shaped steel sheets capable of exerting spring force on the contact surfaces 301 and 302 respectively, thus facilitating parallelity of first and second optical axes X1 and X2 when the first and second barrels 10 and 20 are pulled or pushed.

As shown in FIG. 2, a plurality of posts 103 and 203 are fixed to the first and second barrels 10 and 20 respectively and project from their surfaces. As mentioned, the first and second blocking portions 1021 and 2021, respectively projecting from the first and second barrels 10 and 20, slides on the first cover 104.

In FIG. 2, the binoculars further comprise a longitudinal ring R comprising a first portion R1 and a second portion R2 capable of symmetrical rotation around the center C thereof, wherein the first portion R1 defines a third guide slot R3 and the second protrusion P2 defines a fourth guide slot R4. A first protrusion P1 fixed to the first barrel 10 is movably disposed in the third guide slot R3, and correspondingly, a second protrusion P2 fixed to the second barrel 20 is movably disposed in the fourth guide slot R4. As the protrusions P1 and P2 are respectively restricted within the guide slots R3 and R4 along the longitudinal direction of ring R, the distance from the center C to the first barrel 10 remains equal to the distance from the center C to the second barrel 20.

The first and second covers 104 and 30 are secured enclosing the first and second barrels 10 and 20. As shown in FIG. 3, the first cover 104 has a first guide slot 105 perpendicular to the first optical axis X1 with the first post 103 movably disposed therein and a second guide slot 205 perpendicular to the second optical axis X2 with the second post 203 movably disposed therein. When the barrels 10 and 20 are pulled or pushed, the first post 103 slides in the first guide slot 105, and the second post 203 slides in the second guide slot 205. Thus, the barrels 10 and 20 can be stably guided and adjusted perpendicular to the optical axes X1 and X2 without deflection.

In FIG. 3, the first cover 104 is firmly chucked by the posts 103, 203 movable along the guide slots 105, 205 and the blocking portions 1021, 2021 parallel thereto. Thus, the barrels 10 and 20 are firmly connected to the first cover 104 and movable perpendicular to the optical axes X1 and X2 without deflection.

Figure 4:
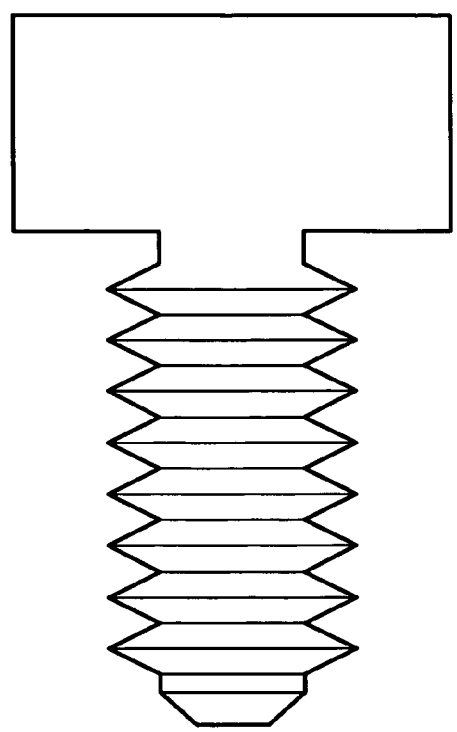
FIG. 4 is a perspective diagram of the post 103 in accordance with an embodiment of the invention.

Referring to FIG. 4, the posts 103 and 203 in this embodiment are threaded and disposed on the barrels 10 and 20 respectively. Using the post 103 as an example, the threaded post 103 is fixed to the barrel 10 and press-fitted in the guide slot 105, thereby avoiding gaps further preventing deflection of the barrels 10 and 20. As mentioned, deflection of the barrels 10 and 20 is also avoided by the resilient members 31 and 32. Additionally, lubricant can be applied between the post 103 and the guide slot 105 to further facilitate smooth movement.

Figure 5:
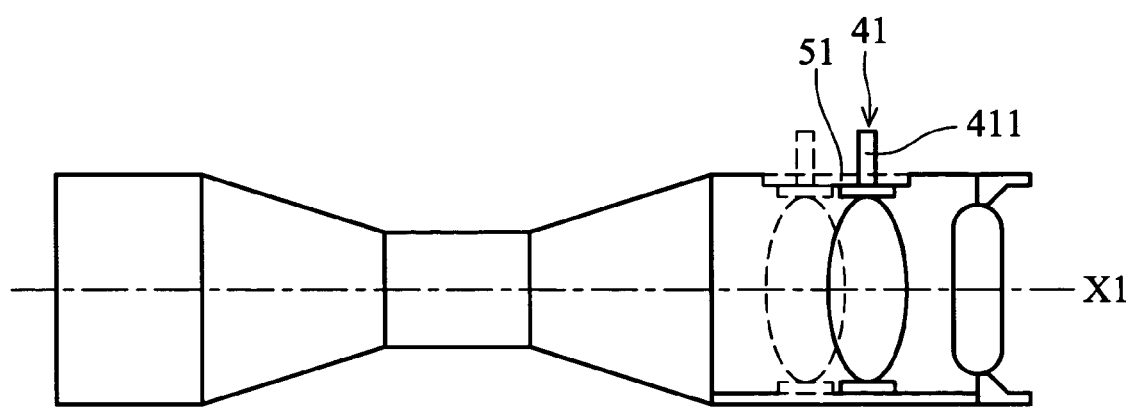
FIG. 5 is a perspective diagram of the first objective lens assembly moving along optical axis X1 in accordance with an embodiment of the invention.

Referring to FIG. 5, first barrel 10 comprises a first objective lens assembly 41 movable along the first optical axis X1. Second barrel 20 comprises a second objective lens assembly (not shown) synchronously moving along the second optical axis X2 with the first objective lens assembly 41. In FIG. 5, the first barrel 10 has a fifth guide slot 51, and the first objective lens assembly 41 comprises a third protrusion 411 movably disposed therein along the first optical axis X1. Similarly, as shown in FIG. 1, the second barrel 20 has a sixth guide slot 52, and the second objective lens assembly (not shown) comprises a fourth protrusion 421 movably disposed therein along the second optical axis X2.

The binoculars further comprise a connecting rod 80 provided with a seventh guide slot 81 and an eighth guide slot 82 perpendicular to the optical axes X1 and X2. The third and fourth protrusions 411 and 421 are movably disposed in the seventh and eighth guide slots 81 and 82 respectively. A screw rod mechanism 90 is connected to the second cover 30, comprising a screw rod (not shown) engaged with the connecting rod 80, thereby driving the first objective lens assembly 41 and the second objective lens assembly 42 synchronously moving along the optical axes X1 and X2.

As mentioned, deflection of the barrels 10 and 20 may be prevented by the wave-shaped resilient member 31 and 32 in an embodiment of the invention. Moreover, due to posts 103 and 203 of the barrels 10 and 20 sliding in the corresponding guide slots 105 and 205, barrels 10 and 20 remain parallel during manual adjustment.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. Binoculars, comprising:
    a first barrel, defining a first optical axis, comprising a first post and a first abutting surface;
    a second barrel, defining a second optical axis parallel to the first optical axis, comprising a second post and a second abutting surface;
    a first cover, comprising a first guide slot substantially perpendicular to the first optical axis and a second guide slot substantially perpendicular to the second optical axis, wherein the first post is movably disposed in the first guide slot and the second post is movably disposed in the second guide slot;
    a second cover connected with the first cover, wherein the first and second barrels are disposed between the first and second covers;
    a first resilient member disposed between the first abutting surface and the first cover, retaining the first post sliding in the first guide slot and the first barrel moving perpendicular to the first optical axis;
    a second resilient member disposed between the second abutting surface and the second cover, retaining the second post sliding in the second guide slot and the second barrel moving perpendicular to the second optical axis.

2. The binoculars as claimed in claim 1, wherein the first barrel further comprises a first blocking portion substantially perpendicular to the first optical axis, abutting the first cover, whereby the first barrel is movable along the first guide slot, and the second barrel further comprises a second blocking portion substantially perpendicular to the second optical axis, abutting the second cover, whereby the second barrel is movable along the second guide slot.

3. The binoculars as claimed in claim 1 further comprising:
    a ring pivoting with the first cover at the center thereof, comprising a first portion and a second portion symmetrical to the center of the ring, wherein the first portion forms a third guide slot and the second portion forms a fourth guide slot;
    a first protrusion fixed to the first barrel and movably disposed in the third guide slot;
    a second protrusion fixed to the second barrel and movably disposed in the fourth guide slot, wherein the ring rotates around the center thereof with the first and second protrusions sliding in the third and fourth guide slots respectively when the first barrel moves perpendicular to the first optical axis and the second barrel moves perpendicular to the second optical axis.

4. The binoculars as claimed in claim 1, wherein the first barrel further comprises an first objective lens assembly movable along the first optical axis, and the second barrel further comprises an second objective lens assembly movable along the second optical axis.

5. The binoculars as claimed in claim 4, wherein the first barrel further comprises a fifth guide slot parallel to the first optical axis, the first objective lens assembly comprises a third protrusion movably disposed in the fifth guide slot, the second barrel further comprises a sixth guide slot parallel to the second optical axis, and the second objective lens assembly comprises a fourth protrusion movably disposed in the sixth guide slot.

6. The binoculars as claimed in claim 5 further comprising:
    a connecting rod comprising a seventh guide slot perpendicular to the first optical axis with the third protrusion movably disposed therein and an eighth guide slot perpendicular to the second optical axis with the fourth protrusion movably disposed therein; and a screw rod mechanism disposed on the second cover, comprising a screw rod engaging and driving the connecting rod parallel to the first and second optical axes thereby driving the first and second objective lens assemblies along the first and second optical axes respectively.

* * * * *